US011542930B2

(12) United States Patent
Higashidozono et al.

(10) Patent No.: US 11,542,930 B2
(45) Date of Patent: Jan. 3, 2023

(54) CAPACITY CONTROL VALVE

(71) Applicant: EAGLE INDUSTRY CO., LTD., Tokyo (JP)

(72) Inventors: Hideki Higashidozono, Tokyo (JP); Masahiro Hayama, Tokyo (JP)

(73) Assignee: EAGLE INDUSTRY CO., LTD.

( * ) Notice: Subject to any disclaimer, the term of this patent is extended or adjusted under 35 U.S.C. 154(b) by 743 days.

(21) Appl. No.: 16/483,621

(22) PCT Filed: Feb. 8, 2018

(86) PCT No.: PCT/JP2018/004500
§ 371 (c)(1),
(2) Date: Aug. 5, 2019

(87) PCT Pub. No.: WO2018/151018
PCT Pub. Date: Aug. 23, 2018

(65) Prior Publication Data
US 2020/0132060 A1 Apr. 30, 2020

(30) Foreign Application Priority Data

Feb. 18, 2017 (JP) .............................. JP2017-028544

(51) Int. Cl.
*F04B 27/18* (2006.01)
*F16K 31/06* (2006.01)

(52) U.S. Cl.
CPC .......... *F04B 27/1804* (2013.01); *F16K 31/06* (2013.01); *F04B 2027/185* (2013.01);
(Continued)

(58) Field of Classification Search
CPC .......... F04B 27/1804; F04B 2027/1813; F04B 2027/1827; F04B 2027/1831;
(Continued)

(56) References Cited

U.S. PATENT DOCUMENTS 1,614,002 A   1/1927   Horton ................. A63C 35/605
2,267,515 A  12/1941   Wilcox ............... F16K 31/0627
(Continued)

FOREIGN PATENT DOCUMENTS

CN   111279076   6/2020   .............. F04B 27/18
CN   111316028   6/2020   .............. F16K 31/06
(Continued)

OTHER PUBLICATIONS

International Search Report (ISR) dated May 15, 2018, issued for International application No. PCT/JP2018/004500 (2 pages).
(Continued)

*Primary Examiner* — Devon C Kramer
*Assistant Examiner* — Joseph S. Herrmann
(74) *Attorney, Agent, or Firm* — Hayes Soloway P.C.

(57) ABSTRACT

In an exemplary embodiment, a capacity control valve includes: a valve main body 2 having a first valve chamber 7 through which a fluid at control pressure passes and which has a first valve seat surface 31A, and an interior space 4 through which a fluid at suction pressure passes; and a valve body 21 having an intermediate communication passage 26 for communicating the first valve chamber 7 and the interior space 4, and a first valve part 21C for opening and closing the intermediate communication passage 26 adjacent to the first valve seat surface 31A, wherein an opening area of the first valve part 21C is smaller than that of the intermediate communication passage 26. The capacity control valve is capable of simultaneously achieving reduction of a start-up time of the variable capacity compressor and improvement of responsiveness of capacity control at the time of control.

12 Claims, 9 Drawing Sheets

(52) U.S. Cl.
CPC .......... *F04B 2027/1813* (2013.01); *F04B 2027/1827* (2013.01); *F04B 2027/1831* (2013.01); *F04B 2027/1859* (2013.01)

(58) Field of Classification Search
CPC ........ F04B 2027/185; F04B 2027/1859; F16K 31/0603; F16K 31/06
See application file for complete search history.

(56) References Cited

U.S. PATENT DOCUMENTS

| | | | |
|---|---|---|---|
| 3,360,304 A | 12/1967 | Adams | B61K 7/12 |
| 3,483,888 A | 12/1969 | Hugo | F16K 15/046 |
| 4,364,615 A | 12/1982 | Euler | F16C 27/04 |
| 4,579,145 A | 4/1986 | Leiber | F16H 61/0251 |
| 4,615,358 A | 10/1986 | Hammond | F16B 13/0402 |
| 4,895,192 A | 1/1990 | Mortenson | F01M 11/04 |
| 4,917,150 A | 4/1990 | Koch | F16K 31/0606 |
| 4,979,542 A | 12/1990 | Mesenich | F02M 47/027 |
| 4,998,559 A | 3/1991 | McAuliffe | F16H 61/0251 |
| 5,060,695 A | 10/1991 | McCabe | G05D 16/2024 |
| 5,217,047 A | 6/1993 | McCabe | F16H 16/0215 |
| 5,263,694 A | 11/1993 | Smith | B60G 15/068 |
| 5,702,235 A | 12/1997 | Hirota | F04B 27/1804 |
| 5,778,932 A | 7/1998 | Alexander | G05D 16/2024 |
| 6,010,312 A | 1/2000 | Suitou | F04B 27/1804 |
| 6,161,585 A | 12/2000 | Kolchinsky | F05D 16/2024 |
| 6,361,283 B1 | 3/2002 | Ota | F04B 27/1084 |
| 6,481,976 B2 | 11/2002 | Kimura | F04B 27/1804 |
| 7,533,687 B2 | 5/2009 | Uemura | F16K 27/048 |
| 8,021,124 B2* | 9/2011 | Umemura | F04B 27/1804 251/333 |
| 8,079,827 B2 | 12/2011 | Iwa | F04B 27/1804 |
| 8,225,818 B1 | 7/2012 | Stephens | F16B 13/0442 |
| 8,651,826 B2* | 2/2014 | Futakuchi | F04B 27/1804 91/483 |
| 9,022,346 B2 | 5/2015 | Najmolhoda | F16K 31/0613 |
| 9,027,598 B2 | 5/2015 | Schneider | F16K 31/0613 |
| 9,132,714 B2 | 9/2015 | Futakuchi | F04B 27/1804 |
| 9,297,373 B2 | 3/2016 | Bagagli | F16K 15/026 |
| 9,400,027 B2 | 7/2016 | Imaizumi | F16F 1/32 |
| 9,453,518 B2 | 9/2016 | Schulz | F16B 13/043 |
| 9,581,149 B2 | 2/2017 | Ota et al. | F04B 27/1804 |
| 9,581,150 B2 | 2/2017 | Ow et al. | |
| 9,732,874 B2 | 8/2017 | Saeki | F16K 31/0603 |
| 9,874,286 B2 | 1/2018 | Bagagli | F16K 15/12 |
| 10,113,539 B2 | 10/2018 | Sugamura | F04B 27/1804 |
| 10,519,944 B2 | 12/2019 | Taguchi | F04B 27/1804 |
| 10,557,463 B2 | 2/2020 | Sugamura | F04B 27/1804 |
| 10,690,125 B2* | 6/2020 | Hayama | F04B 27/18 |
| 10,784,804 B2* | 9/2020 | Sasaki | H02P 25/022 |
| 10,837,431 B2 | 11/2020 | Tonegawa | F04B 49/22 |
| 2001/0003573 A1 | 6/2001 | Kimura et al. | 417/222.2 |
| 2002/0134444 A1 | 9/2002 | Isobe | F16K 27/041 |
| 2003/0145615 A1 | 8/2003 | Sasaki | F16K 31/0637 |
| 2003/0202885 A1 | 10/2003 | Taguchi | F04B 49/00 |
| 2004/0045305 A1 | 3/2004 | Murase | F25B 49/022 |
| 2004/0165994 A1 | 8/2004 | Umemura | F04B 27/1804 |
| 2005/0076959 A1 | 4/2005 | Yamamoto | F16K 31/0624 |
| 2005/0151310 A1 | 7/2005 | Rodeffer | F16F 1/34 |
| 2007/0214814 A1* | 9/2007 | Umemura | F04B 27/1804 62/228.1 |
| 2007/0264134 A1 | 11/2007 | Hirota | F04B 27/1804 |
| 2008/0138213 A1 | 6/2008 | Umemura et al. | 417/222.2 |
| 2008/0175727 A1 | 7/2008 | Umemura et al. | F04B 49/22 |
| 2009/0108221 A1 | 4/2009 | Umemura et al. | 251/129.15 |
| 2009/0114871 A1 | 5/2009 | Iwa | F04B 27/14 |
| 2009/0183786 A1* | 7/2009 | Iwa | F04B 27/1804 137/488 |
| 2009/0256091 A1 | 10/2009 | Nordstrom | F16K 31/0613 |
| 2010/0282991 A1 | 11/2010 | Okamoto | F16K 31/02 |
| 2011/0061749 A1 | 3/2011 | Okamoto | F16K 31/0655 |
| 2011/0089352 A1 | 4/2011 | Morgan | F16K 11/0716 |
| 2012/0056113 A1 | 3/2012 | Tano | F04B 27/1804 |
| 2012/0198992 A1 | 8/2012 | Futakuchi et al. | 91/505 |
| 2012/0198993 A1 | 8/2012 | Fukudome | 91/505 |
| 2012/0211686 A1 | 8/2012 | Okamoto | F16K 31/0655 |
| 2013/0291963 A1 | 11/2013 | Futakuchi et al. | 137/487.5 |
| 2014/0099214 A1* | 4/2014 | Fukudome | G05D 7/0106 251/120 |
| 2014/0130916 A1 | 5/2014 | Saeki | F16K 31/0613 |
| 2014/0294632 A1 | 10/2014 | Kondo et al. | 417/434 |
| 2014/0369862 A1 | 12/2014 | Ota et al. | F04B 27/1804 |
| 2015/0021131 A1 | 1/2015 | Wootten | F16F 9/348 |
| 2015/0027573 A1 | 1/2015 | Ochiai | F15B 13/0402 |
| 2015/0044067 A1 | 2/2015 | Ota et al. | F04B 27/1804 |
| 2015/0068628 A1 | 3/2015 | Iwa | 137/625.65 |
| 2015/0104334 A1 | 4/2015 | Ota et al. | F04B 27/1804 |
| 2015/0275874 A1 | 10/2015 | Ota | F04B 27/1804 |
| 2015/0345655 A1 | 12/2015 | Higashidozono | 137/624.27 |
| 2016/0053755 A1 | 2/2016 | Taguchi | F04B 49/22 |
| 2016/0290326 A1 | 10/2016 | Sugamura | F04B 27/1804 |
| 2017/0284562 A1 | 10/2017 | Hayama | F16K 41/00 |
| 2018/0156345 A1 | 6/2018 | Kanda | F15B 13/0431 |
| 2018/0187793 A1 | 7/2018 | Futakuchi | F04B 39/08 |
| 2018/0291888 A1 | 10/2018 | Tonegawa et al. | F04B 49/22 |
| 2019/0162175 A1 | 5/2019 | Higashidozono | F04B 27/18 |
| 2020/0032781 A1* | 1/2020 | Higashidozono | F16K 31/0624 |
| 2020/0309105 A1 | 10/2020 | Hayama et al. | F04B 27/18 |
| 2020/0318624 A1 | 10/2020 | Hayama | F04B 27/18 |
| 2020/0332786 A1* | 10/2020 | Hayama | F04B 49/22 |
| 2020/0362974 A1 | 11/2020 | Hayama | F16K 11/24 |
| 2020/0370545 A1 | 11/2020 | Hayama et al. | F04B 27/18 |
| 2021/0372396 A1 | 12/2021 | Kurihara | G05D 7/0635 |

FOREIGN PATENT DOCUMENTS

| | | | |
|---|---|---|---|
| CN | 111417780 | 7/2020 | F04B 27/18 |
| EP | 2594794 | 5/2013 | F04B 27/18 |
| EP | 3726054 | 10/2020 | F04B 27/18 |
| JP | 6-26454 | 2/1994 | F04B 27/08 |
| JP | 2001165055 | 6/2001 | F04B 27/14 |
| JP | 2004003468 | 1/2004 | F04B 27/14 |
| JP | 2005307817 | 11/2005 | F04B 27/14 |
| JP | 2007747512 | 9/2007 | F04B 27/14 |
| JP | 2008157031 | 7/2008 | F04B 27/14 |
| JP | 2009275550 | 11/2009 | F04B 49/00 |
| JP | 2012144986 A | 8/2012 | |
| JP | 2012211579 | 11/2012 | F04B 27/14 |
| JP | 5167121 B2 | 3/2013 | |
| JP | 2014080927 | 5/2014 | F04B 27/16 |
| JP | 2014092207 | 5/2014 | F16K 31/06 |
| JP | 2014095463 | 5/2014 | F16K 31/06 |
| JP | 2014194180 | 10/2014 | F04B 27/14 |
| JP | 201575054 | 4/2015 | F04B 27/14 |
| JP | 20151168 | 5/2015 | F04B 27/14 |
| JP | 2015137546 | 7/2015 | F04B 27/14 |
| JP | 2015178795 | 10/2015 | F04B 27/14 |
| JP | 5983539 | 8/2016 | F04B 27/18 |
| JP | 2016196825 | 11/2016 | F04B 27/18 |
| JP | 2016196876 | 11/2016 | F04B 27/18 |
| JP | 2016205404 | 12/2016 | F04B 27/18 |
| JP | 6135521 | 5/2017 | F04B 27/18 |
| JP | 2017089832 | 5/2017 | F16K 31/06 |
| JP | 2018179087 | 11/2018 | F16K 31/06 |
| WO | WO2006090760 | 8/2006 | F04B 27/18 |
| WO | 2007119380 A1 | 10/2007 | |
| WO | WO2009025298 | 2/2009 | F16K 31/06 |
| WO | WO2011114841 | 9/2011 | F04B 27/14 |
| WO | WO2012077439 | 6/2012 | F04B 27/14 |
| WO | WO2014119594 | 8/2014 | F04B 27/14 |
| WO | WO2014148367 | 9/2014 | F16K 31/06 |

OTHER PUBLICATIONS

The First Office Action issued in Chinese Patnet Appln. Serial No. 201880081296.0, dated Jul. 5, 2021, with English translation, 9 pages.

Extended European Search Report issued in European Patent Appln. Serial No. 18896700.4, dated Aug. 12, 2021, 8 pages.

European Official Action issued in related European Patent Application Serial No. 18885296.6, dated Jan. 21, 2022, 4 pages.

(56) References Cited

OTHER PUBLICATIONS

International Preliminary Report on Patentability issued in PCT/JP2018/047716, dated Jun. 30, 2020, 8 pages.
International Search Report and Written Opinion issued in PCT/JP2018/047716, dated Mar. 26, 2019, with English translation, 14 pages.
International Preliminary Report on Patentability issued in PCT/JP2014/051901, dated Aug. 13, 2015, 7 pages.
International Search Report issued in PCT/JP2014/051901, dated Apr. 18, 2014, 4 pages.
International Prehrimary Report on Patentability, International Search Report and Written Opinion issued in PCT/JP2019/045731, dated Feb. 4, 2020, 21 pages.
International Search Report issued in PCT/JP2018/004500, dated May 15, 2018, 12 pages.
International Preliminary Report on Patentability issued in PCT/JP2018/004500, dated. Aug. 20, 2019, 4pages.
International Search Report issued in PCT/JP2018/041768, dated Jan. 22, 2019, 12 pages.
International Preliminary Report on Patentability issued in PCT/JP2018/041768, dated May 19, 2020, 6 pages.
International Search Report issued in PCT/JP2018/002084, dated Apr. 17, 2018, 11 pages.
International Preliminary Report on Patentability issued in PCT/JP2018/002084, dated Jul. 30, 2019, 4 pages.
International Search Report issued in PCT/JP2018/047693, dated Mar. 19, 2019, 11 pages.
International Preliminary Report on Patentability issued in PCT/JP2018/047693, dated Jun. 30, 2020, 4 pages.
International Search Report issued in PCT/JP2018/047694, dated Mar. 19, 2019, 20 pages.
International Preliminary Report on Patentability issued in PCT/JP2018/047694, dated Jun. 30, 2020, 7 pages.
International Search Report issued in PCT/JP2018/045010, dated Feb. 26, 2019, 11 pages.
International Preliminary Report on Patentability issued in PCT/JP2018/045010, dated Jun. 9, 2020, 4 pages.
International Search Report issued in PCT/JP2019/001569, dated Apr. 16, 2019, 20 pages.
International Preliminary Report on Patentability issued in PCT/JP2019/001569, dated Oct. 15, 2018, 7pages.
Official Action issued in related U.S. Appl. No. 16/957,340, dated Feb. 4, 2022 (18 pgs).
Official Action issued in related U.S. Appl. No. 16/957,340, dated Sep. 20, 2021 (20 pgs).
Notice of Allowance issued in related US Application U.S. Appl. No. 16/961,620, dated Feb. 9, 2022 (6 pgs).
Notice of Allowance issued in related U.S. Appl. No. 16/772,703, dated Oct. 13, 2021 (5 pgs).
Official Action issued in related U.S. Appl. No. 16/961,620, dated Aug. 5, 2021 (7 pgs).
Official Action issued in related U.S. Appl. No. 17/293,435, dated Nov. 23, 2021 (12 pgs).
U.S. Appl. No. 16/480,281, filed Jul. 23, 2019, Higashidozono et al.
U.S. Appl. No. 16/483,621, filed Aug. 5, 2019, Higasgidozono et al.
U.S. Appl. No. 16/763,800, filed May 13, 2020, Hayama et al.
U.S. Appl. No. 16/766,096, filed May 21, 2020, Kurihara et al.
U.S. Appl. No. 16/957,340, filed Jun. 23, 2020, Hayama et al.
U.S. Appl. No. 16/957,344, filed Jun. 23, 2020, Hayama et al.
U.S. Appl. No. 16/961,620, filed Jul. 10, 2020, Hayama et al.
U.S. Appl. No. 17/293,435, filed May 12, 2021, Hayama et al.
U.S. Appl. No. 16/772,703, filed Jun. 12, 2020, Hayama et al.
U.S. Appl. No. 14/431,270, filed Mar. 25, 2015, Higashidozono et al.

European Official Action issued in related European Patent Application Serial No. 18897846.4, dated Apr. 14, 2022 (5 pgs).
European Office Action issued in related European Patent Application Serial No. 19890548.1, dated May 24, 2022 (6 pgs).
European Official Action issued in related European Patent Application Serial No. 18884020.1, dated Jun. 28, 2022 (4 pgs).
Korean Official Action issued in related Korean Patent Application Serial No. 10-2020-7013914, dated Mar. 15, 2022 (5 pgs).
Chinese Office Action issued in Chinese Patent Appln. Serial No. 201880080867.9, dated Mar. 16, 2022, with English translation, 13 pages.
Chinese Office Action issued in Chinese Patent Appln. Serial No. 201880072030.X, dated Jun. 6, 2022, with English translation, 12 pages.
Chinese Office Action issued in Chinese Patent Appln. Serial No. 201980075007.0, dated Jun. 6, 2022, with English translation, 8 pages.
Japanese Office Action issued in Japanese Patent Appln. Serial No. 2019-562060, dated May 10, 2022, with English translation, 8 pages.
Japanese Office Action issued in Japanese Patent Appln. Serial No. 2019-562061, dated May 10, 2022, with English translation, 10 pages.
Japanese Office Action issued in Japanese Patent Appln. Serial No. 2019-559188, dated Jul. 13, 2022, with English translation, 9 pages.
International Search Report and Written Opinion with translation issued in PCT/JP2019/001570, dated Jul. 25, 2019 (19 pages).
International Preliminary Report on Patentability with translation issued in PCT/JP2019/001570, dated Jul. 28, 2020 (6 pages).
International Search Report and Written Opinion with translation issued in PCT/JP2018/043652, dated Feb. 19, 2019, (21 pages).
International Preliminary Report on Patentability with translation issued in PCT/JP2018/043652, dated Jun. 2, 2020 (7 pages).
International Search Report and Written Opinion with translation issued in PCT/JP2018/045782, dated Feb. 26, 2019 (11 pages).
International Preliminary Report on Patentability with translation issued in PCT/JP2018/045782, dated Jun. 16, 2020 (4 pages).
Notice of Allowance issued in related U.S. Appl. No. 16/772m703, dated Oct. 13, 2021 (5 pgs).
Official Action issued in related U.S. Appl. No. 17/293,435, dated Mar 31, 2022 (11 pgs).
Official Action issued in related U.S. Appl. No. 16/961, 627, dated Oct. 6, 2021, (24 pgs).
Official Action issued in related U.S. Appl. No. 16/766,124, dated Oct. 27, 2021 (11 pgs).
Notice of Allowance issued in related U.S. Appl. No. 16/766,124, dated Apr. 4, 2022 (5 pgs).
Notice of Allowance issued in related U.S. Appl. No. 16/957,340, dated May 24, 2022 (16 pgs).
Notice of Allowance issued in related U.S. Appl. No. 16/961,627, dated May 5, 2022 (19 pgs).
Official Action issued in related U.S. Appl. No. 16/957,344, dated Mar. 29, 2022 (19 pgs).
Official Action issued in related U.S. Appl. No. 16/763,800, dated Jun. 8, 2022 (9 pgs).
Official Action issued in related U.S. Appl. No. 16/480,281, dated Jun. 8, 2022 (15 pgs).
Official Action issued in related U.S. Appl. No. 16/766,096, dated May 27, 2022, (7 pgs).
Official Action issued in related U.S. Appl. No. 16/771,548, dated Dec. 8, 2021 (15 pgs).
Official Action issued in related U.S. Appl. No. 16/771,548, dated Jun. 7m 2022 (11 pgs).

* cited by examiner

X-X cross-section

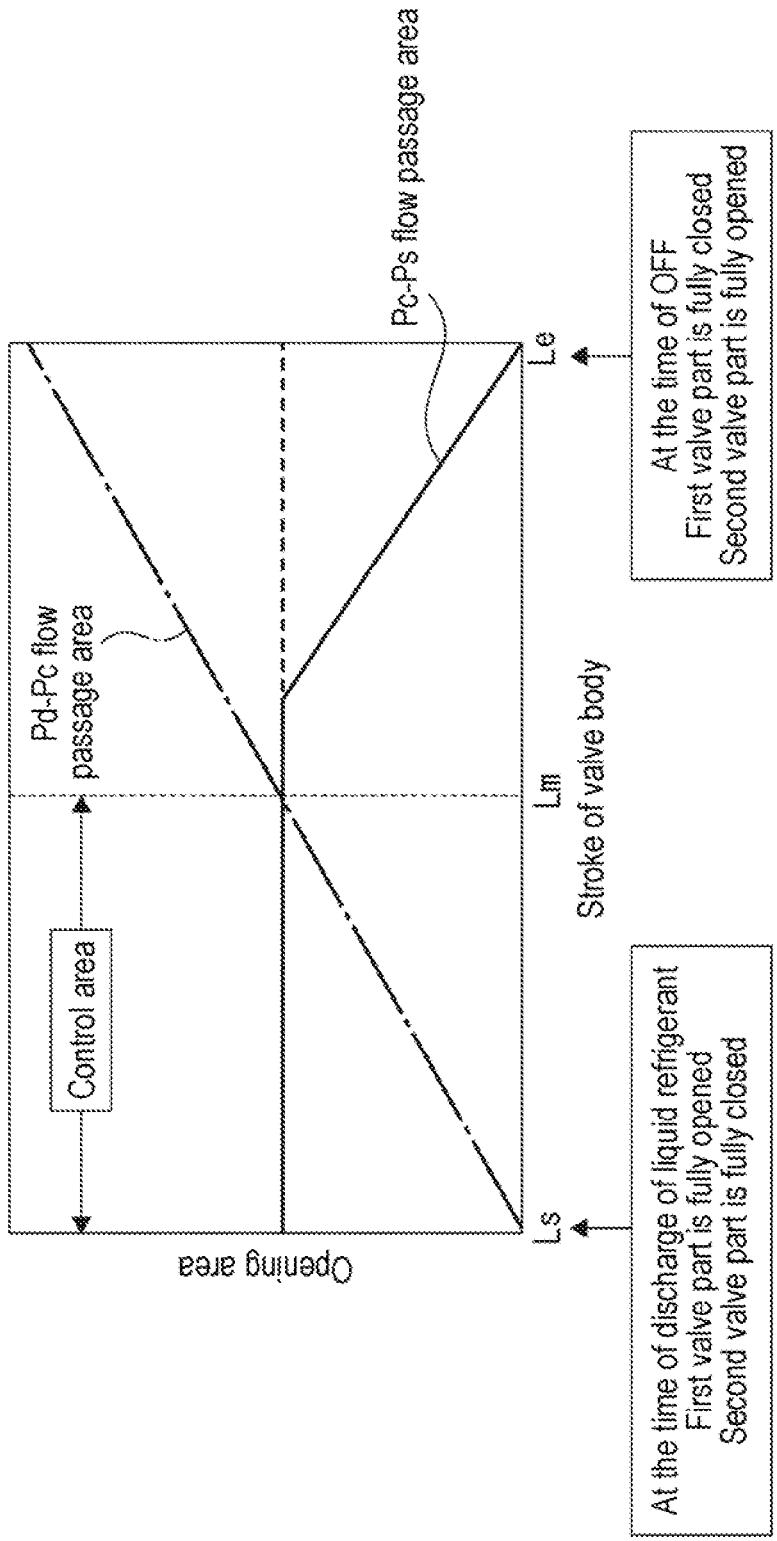

CAPACITY CONTROL VALVE

CROSS-REFERENCE TO RELATED APPLICATIONS

This application is the U.S. National Phase under 35 U.S.C. § 371 of International Application PCT/JP2018/004500, filed Feb. 8, 2018, which claims priority to Japanese Patent Application No. 2017-028544, filed Feb. 18, 2017. The International Application was published under PCT Article 21 (2) in a language other than English.

TECHNICAL FIELD

The present invention relates to a capacity control valve for variably controlling capacity or pressure of a working fluid, and, particularly, relates to a capacity control valve for controlling a discharge rate of a variable capacity compressor and the like used for an air-conditioning system for motor vehicle and the like according to a pressure load.

BACKGROUND ART

A swash plate type variable capacity compressor used for an air-conditioning system for motor vehicle and the like includes a rotating shaft rotationally driven by the rotational force of an engine, a swash plate which is coupled to the rotating shaft so that its inclination angle may be varied, a piston for compression coupled to the swash plate, and the like, and changes the inclination angle of the swash plate, thereby changing a stroke of the piston and controlling a discharge rate of a refrigerant.

By appropriately controlling pressure within a control chamber and adjusting a balancing state of the pressure acting on the both surfaces of the piston by means of a capacity control valve which is driven to be opened or closed by electromagnetic force while utilizing a suction pressure of a suction chamber for suctioning a refrigerant, a discharge pressure of a discharge chamber for discharging the refrigerant pressurized by the piston, and a control chamber pressure of the control chamber (a crank chamber) containing the swash plate, the inclination angle of the swash plate can be continuously changed.

As such a capacity control valve, as shown in FIG. 7, known is a capacity control valve 170 including: a valve section having a second valve chamber 182 communicating with a discharge chamber via a second communication passage 173, a first valve chamber 183 communicating with a suction chamber via a first communication passage 171, and a third valve chamber 184 communicating with a control chamber via a third communication passage 174; a pressure sensitive body 178 which is arranged in the third chamber to extend and contract by ambient pressure and which has a valve seat body 180 provided at a free end in an extension and contraction direction; a valve body 181 having a second valve part 176 for opening and closing a valve hole 177 for communicating the second valve chamber 182 and the third valve chamber 184, a first valve part 175 for opening and closing the first communication passage 171 and a circulation groove 172, and a third valve part 179 for opening and closing the third valve chamber 184 and the circulation groove 172 by engagement and disengagement to and from the valve seat body 180 in the third valve chamber 184; a solenoid section S for exerting an electromagnetic driving force on the valve body 181, and the like (Hereinafter, it is referred to as a "conventional art". For example, see Patent Citation 1).

Then, in the capacity control valve 170, without providing a clutch mechanism in a variable capacity compressor, in a case where the need to change pressure in the control chamber (a control chamber pressure) Pc arises, the control chamber pressure can be adjusted by communicating the discharge chamber and the control chamber. Moreover, in a case where the control chamber pressure Pc is increased in a stop state of the variable capacity compressor, the suction chamber and the control chamber are communicated by disengaging the third valve part (a valve opening coupling part) 179 from the valve seat body (an engagement part) 180 and opening a suction side passage.

However, if the swash plate type variable capacity compressor is stopped and then is intended to be started after a long-time standing, a liquid refrigerant (the refrigerant which is liquefied by being cooled during standing) is accumulated in the control chamber (crank chamber), and therefore it is impossible to secure a set discharge rate by compressing the refrigerant unless the liquid refrigerant is discharged. Therefore, in order to perform a desired capacity control just after start-up, the liquid refrigerant in the control chamber (crank chamber) needs to be discharged as quickly as possible.

Thus, in the above-described conventional art, an auxiliary communication passage 185 is provided in the third valve part 179, and, via the auxiliary communication passage 185, an intermediate communication passage 186, and the circulation groove 172 from the third valve chamber 184, the third valve chamber 184 communicating with the control chamber and the first communication passage 171 communicating with the suction chamber can be communicated. Thereby, as shown by an arrow in FIG. 7, when the variable liquid refrigerant capacity compressor is started to air-condition, the liquid refrigerant is discharged to the discharge chamber via the suction chamber from the control chamber (crank chamber), and the refrigerant liquid in the control chamber is vaporized. Thereby, a cooling operation state can be achieved in one-tenth to one-fifteenth time compared to a capacity control valve without the auxiliary communication passage 185.

FIG. 7 and FIG. 8(a) shows a state that the solenoid section S is energized, an opening spring means 187 contracts, and the first valve part 175 is opened. On the other hand, FIG. 8(c) shows a state that, when the solenoid section S is in an OFF state, the first valve part 175 is closed and the second valve part 176 is opened by extension of the opening spring means 187, and the third valve part 179 is opened on receiving a suction chamber pressure Ps and the control chamber pressure Pc.

For example, at the time of start-up, the refrigerant liquid in the control chamber is vaporized, and the fluid at the control chamber pressure Pc flows into the third valve chamber 184 through the third communication passage 174. In this state, the control chamber pressure Pc and the suction chamber pressure Ps are high, the pressure sensitive body (bellows) 178 contracts, and the third valve part 179 and a valve seat surface of the valve seat body 180 are opened therebetween. However, a valve opening amount between the third valve part 179 and the valve seat body 180 has functional restrictions, and therefore vaporization of the refrigerant liquid in the third valve chamber 184 is advanced only gradually by this opening valve state alone. Thus, by providing the auxiliary communication passage 185 communicating with the intermediate communication passage 186, the refrigerant liquid in the control chamber can be vaporized rapidly.

Subsequently, when discharge of the liquid refrigerant in the control chamber (crank chamber) is finished, the control chamber pressure Pc and the suction chamber pressure Ps are decreased, and the third valve part 179 and the valve seat surface of the valve seat body 180 are closed therebetween. At the same time, the second valve part 176 becomes into an opened state from a fully closed state by the solenoid section S, and the fluid at the discharge chamber pressure Pd is supplied to the third valve chamber 184 from the second valve chamber 182, and thereby a differential pressure between the suction chamber pressure and the control chamber pressure is changed, an inclination angle of the swash plate is changed, and a stroke (discharge capacity) of a piston is controlled. Concretely, when the pressure of the crank chamber is decreased, the inclination angle of the swash plate is increased, and the discharge capacity of the compressor is increased. On the contrary, if the pressure of the crank chamber is increased, the inclination angle of the swash plate is decreased, and the discharge capacity of the compressor is decreased.

However, in the above-described conventional art, even if discharge of the liquid refrigerant in the control chamber (crank chamber) is finished and a control operation begins, and the third valve part 179 and the valve seat surface of the valve seat body 180 are closed therebetween, the third valve chamber 184 and the first valve chamber 183 are communicated by the auxiliary communication passage 185, the intermediate communication passage 186, the first communication passage 171, the circulation groove 172, and the first valve part 175. Therefore, even if the refrigerant is supplied to the control chamber from the discharge chamber in order to control the control chamber pressure, the refrigerant tends to flow to the suction chamber from the control chamber, and thus the control chamber pressure was not able to be rapidly controlled to a predetermined pressure.

This point will be described in detail with reference to FIG. 7 to FIG. 9. A Pc-Ps flow passage for communicating the third valve chamber 184 and the first valve chamber 183 consists of the auxiliary communication passage 185, the intermediate communication passage 186, the first communication passage 171, and the circulation groove 172, and an area Sa of an opening part of the Pc-Ps flow passage is constant as shown by a dotted line in FIG. 9. Moreover, a stroke of the valve body 181 at the time of discharge of the liquid refrigerant is Ls, a stroke of the valve body 181 when the solenoid is OFF is Le, and a stroke L of the valve body 181 in a control area is controlled so as to be Ls<L<Lm.

As shown by a solid line in FIG. 9, in the control area (Ls<L<Lm), the area of the Pc-Ps flow passage is almost constant regardless of the stroke of the valve body 181, and is narrowed only when a stroke Lm of the valve body 181 is exceeded. Therefore, in the control area (Ls<L<Lm) of the variable capacity compressor, even if the refrigerant is supplied to the third valve chamber 184 communicating with the control chamber from the second valve chamber 182 in order to control the pressure of the control chamber, the refrigerant tends to flow to the first valve chamber 183 through the Pc-Ps flow passage and the first valve part 175 from the third valve chamber 184, and thus the pressure of the control chamber was not able to be rapidly controlled to a predetermined pressure.

Moreover, in the above-described conventional art, in a control device for controlling the capacity control valve, the pressure sensitive body (bellows) 178 for sensing the pressure was arranged in the third valve chamber 184 communicating with the control chamber, and the control chamber pressure Pc was detected, thereby capacity control was performed. However, fluctuation in pressure according to the load of the variable capacity compressor rapidly appears in the suction chamber pressure Ps, and therefore it is preferred that the suction chamber pressure Ps is detected by the pressure sensitive body (bellows).

CITATION LIST

Patent Literature

Patent Citation 1: JP 5167121 B

SUMMARY OF INVENTION

Technical Problem

The present invention has been made to solve the problems the above-described conventional art has, and an object thereof is to provide a capacity control valve in which discharge function of a liquid refrigerant in a control chamber at the time of start-up of a variable capacity compressor is improved, the capacity control valve capable of simultaneously achieving reduction of a start-up time of the variable capacity compressor and improvement of responsiveness of capacity control at the time of control.

Solution to Problem

In a first aspect, a capacity control valve for controlling a flow rate or pressure in a control chamber according to a valve opening degree of a valve section is characterized by including:

a valve main body having a first valve chamber communicating with a first communication passage through which a fluid at control pressure passes and having a first valve seat surface and a second valve seat surface, a second valve chamber having a valve hole communicating with the first valve chamber and communicating with a second communication passage through which a fluid at discharge pressure passes, and an interior space communicating with a third communication passage through which a fluid at suction pressure passes;

a pressure sensitive body arranged in the interior space and having a communication part communicating with the interior space on a free end part side moving so as to extend and contract in response to the suction pressure;

a valve body including at least an intermediate communication passage for communicating the first valve chamber and the interior space, a second valve part for opening and closing the valve hole for communicating the first valve chamber and the second valve chamber by separating from and contacting with the second valve seat surface, a first valve part for opening and closing the intermediate communication passage by separating from and contacting with the first valve seat surface in conjunction with the second valve part in the opposite direction thereto, and an abutment part abutting the free end part of the pressure sensitive part; and a solenoid section attached to the valve main body and actuating the respective valve parts of the valve body so as to be opened and closed, and is characterized in that:

an opening area of the first valve part is smaller than that of the intermediate communication passage.

According to the first aspect, since as to resistance of a flow passage leading to the interior space through the first valve part and the intermediate communication passage from the first valve chamber, the first valve part whose opening area is small serves as a bottleneck, if the second valve part is disengaged from the second valve seat surface and is opened, and at the same time the first valve part serving as the bottleneck is narrowed, the amount of the refrigerant at the control pressure flowing out of the first valve chamber to the interior space is decreased, and the amount of the refrigerant at the discharge pressure flowing into the first valve chamber from the second valve chamber is increased, and therefore the pressure of the control chamber communicating with the first valve chamber can be rapidly controlled.

In a second aspect, the capacity control valve of the present invention is characterized in that the second valve part is disengaged from the second valve seat surface, and at the same time, resistance of a flow passage leading to the interior space from the first valve chamber is increased according to a stroke of the valve body, and resistance of a flow passage leading to the first valve chamber from the second valve chamber is decreased according to the stroke of the valve body.

According to the second aspect, since the second valve part is disengaged from the second valve seat surface and is opened, and at the same time the first valve part serving as the bottleneck is narrowed, the amount of the refrigerant flowing out of the first valve chamber through the first valve part and the intermediate communication passage to the interior space can be decreased according to the stroke of the valve body, and the amount of the refrigerant flowing to the first valve chamber from the second valve chamber can be increased according to the stroke of the valve body, and therefore the pressure of the control chamber can be rapidly controlled according to the stroke, and responsiveness at the time of control of the variable capacity compressor can be improved.

In a third aspect, the capacity control valve of the present invention is characterized in that the opening area of the first valve part when the second valve part is closed is set to exceed a blow-by gas amount.

According to the third aspect, the refrigerant exceeding the blow-by gas amount can be discharged from the first valve chamber to the interior space in a state that the flow from the second valve chamber to the first valve chamber is blocked, and therefore the liquid refrigerant can be discharged in a short time.

In a fourth aspect, the capacity control valve of the present invention is characterized in that the first valve part has a first valve part surface opposed to the first valve seat surface, and an axial gap part whose size is changed according to the stroke of the valve body is included between the first valve part surface and the first valve seat surface.

According to the fourth aspect, an opening degree of the first valve part can be adjusted by the size of the axial gap part according to the stroke of the valve body, and the first valve part can be opened and closed by separation and contact between the first valve part surface and the first valve seat surface, therefore the structure thereof can be simplified.

In a fifth aspect, the capacity control valve is characterized in that the first valve part has a first valve part surface opposed to the first valve seat surface and formed in a radial direction and a tapered surface whose diameter is reduced toward an axial direction from an inner diameter part of the first valve part surface, and an axial gap part whose size is changed according to the stroke of the valve body is included between the first valve part surface and the first valve seat surface and a radial gap part whose size is changed according to the stroke of the valve body is included between the tapered surface and the first valve seat surface.

According to the fifth aspect, the axial gap part depends on the size of the stroke of the valve body, and the size of the radial gap part depends on a taper angle, therefore the size of the axial gap part and the size of the radial gap part can be determined independently. Therefore, the opening degree of the first valve part can be reduced by adjusting the taper angle without reducing a stroke width of the valve body, so it is possible to prevent deterioration in controllability of the capacity control valve by securing the stroke width of the valve body.

BRIEF DESCRIPTION OF DRAWINGS

FIG. 9 is an explanatory diagram for explaining a relationship between opening areas of a Pc-Ps flow passage and a Pd-Pc flow passage and a stroke of a valve body of the capacity control valve according to the conventional art.

DESCRIPTION OF EMBODIMENTS

Hereinafter with reference to the drawings, modes for carrying out the present invention will be described illustratively based on embodiments. However, the dimensions, materials, shapes, relative arrangements, and others of components described in the embodiments are not intended to limit the scope of the present invention only to them unless otherwise described explicitly.

First Embodiment

Figure 1:
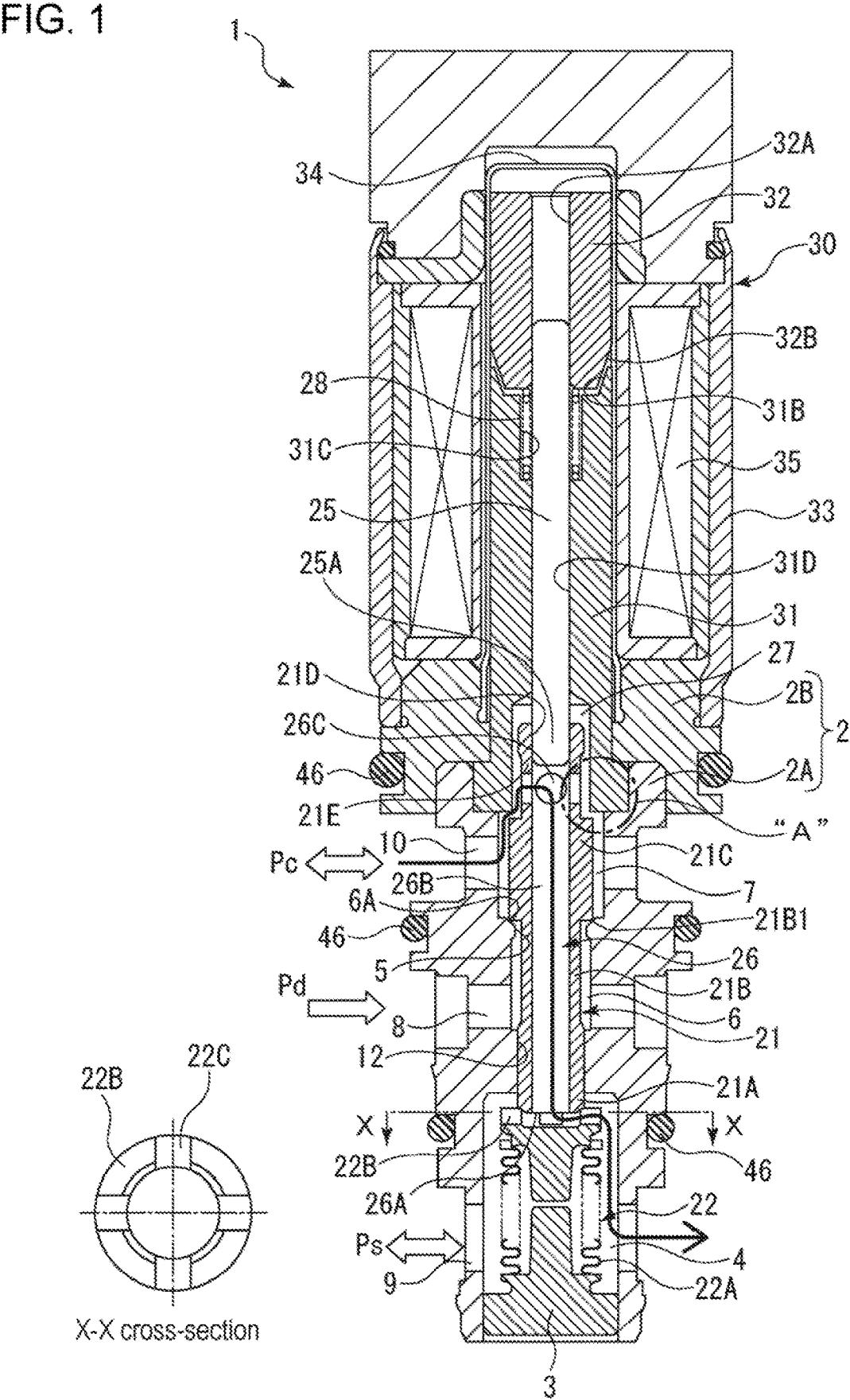
FIG. 1 is a front cross-sectional view showing a capacity control valve according to a first embodiment of the present invention.
Figure 2:
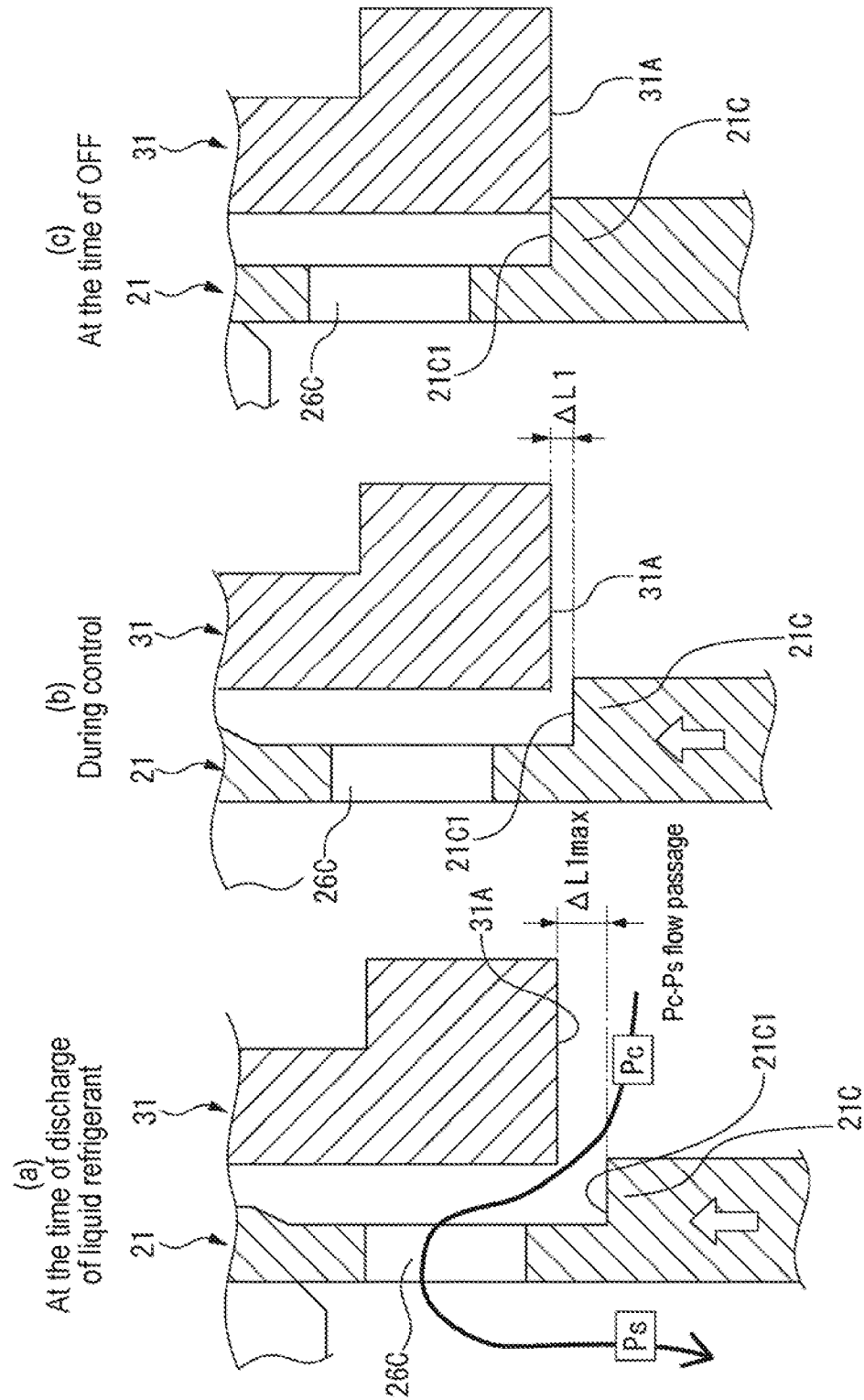
FIG. 2 is an enlarged view of a portion A in FIG. 1, and shows an opening state of a first valve part in each state.
Figure 3:
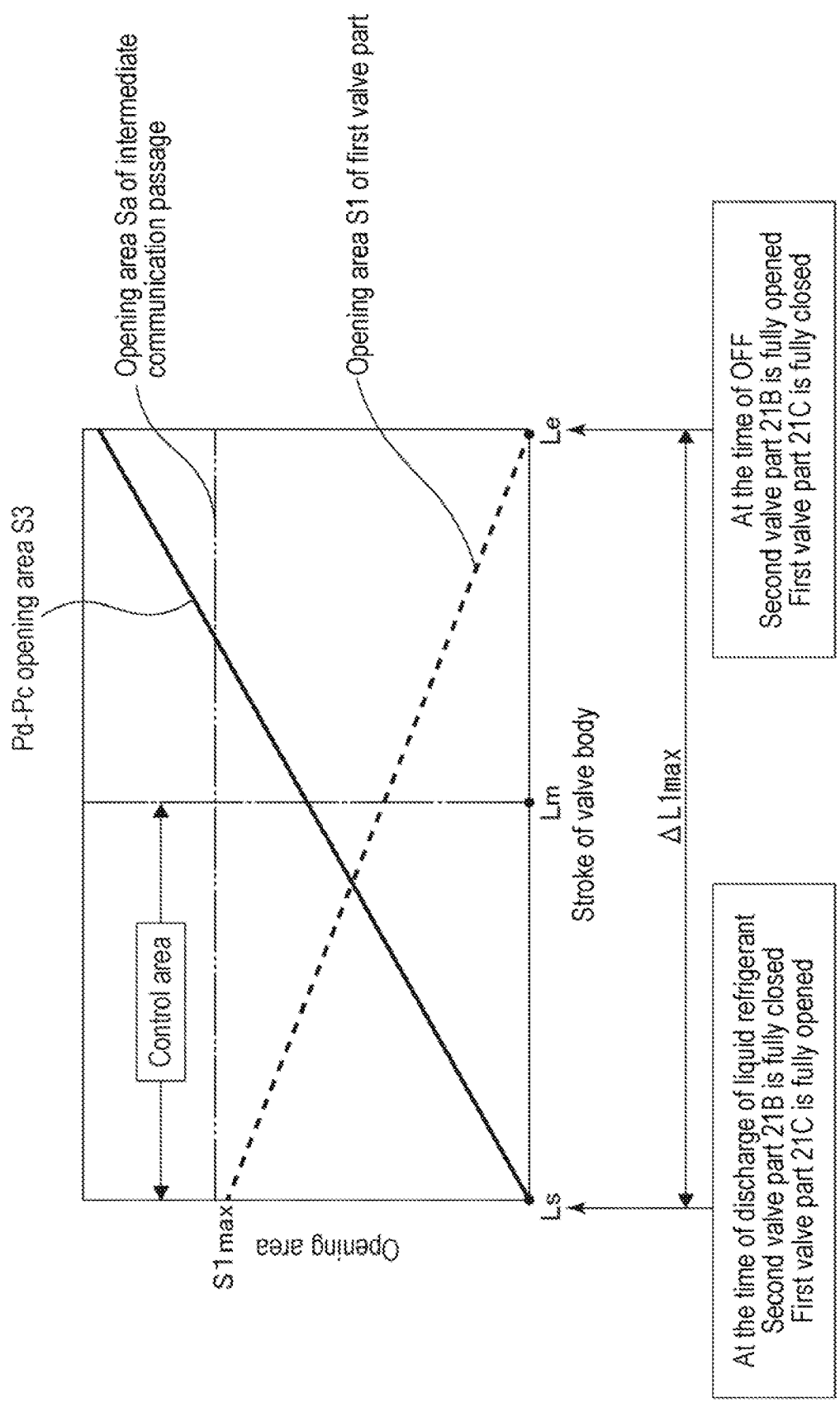
FIG. 3 is an explanatory diagram for explaining a relationship between opening areas of a Pc-Ps flow passage and a Pd-Pc flow passage and a stroke of a valve body of the capacity control valve according to the first embodiment.

With reference to FIG. 1 to FIG. 3, a capacity control valve according to a first embodiment of the present invention will be described. In FIG. 1, 1 denotes a capacity control valve. The capacity control valve 1 mainly consists of a valve main body 2, a valve body 21, a pressure sensitive body 22, and a solenoid section 30. Hereinafter, each configuration constituting the capacity control valve 1 will be described.

The valve main body 2 consists of a first valve main body 2A having a through hole whose functions are added therein, and a second valve main body 2B integrally fitted to one end part of the first valve main body 2A. Moreover, the first valve main body 2A is composed of a metal such as brass, iron, aluminum, or stainless steel, a synthetic resin material, or the like. On the other hand, the second valve main body 2B is composed of a magnetic body such as iron whose magnetic resistance is small, in order to function as a magnetic path of the solenoid section 30. The second valve main body 2B is provided separately so as to differ in functions from the material of the first valve main body 2A. Considering this point, the shape shown in FIG. 1 may be appropriately changed.

The first valve main body 2A is a hollow cylindrical member having a through hole penetrating in an axial direction, and in a compartment of the through hole, an interior space 4, a second valve chamber 6, and a first valve chamber 7 are sequentially arranged. That is, in the compartment of the through hole, the interior space 4 is formed on one end side, the second valve chamber 6 is successively arranged on the solenoid section 30 side adjacent to the interior space 4, and the first valve chamber 7 is consecutively provided on the solenoid section 30 side adjacent to the second valve chamber 6. Moreover, between the interior space 4 and the second valve chamber 6, a clearance seal part 12 having a diameter smaller than that of those chambers is successively arranged. Further, between the second valve chamber 6 and the first valve chamber 7, a valve hole 5 having a diameter smaller than that of those chambers is consecutively provided, and on a side of the first valve chamber 7 around the valve hole 5, a second valve seat surface 6A is formed.

To the interior space 4, a third communication passage 9 is connected. The third communication passage 9 is configured to communicate with a suction chamber of a variable capacity compressor (not shown) such that a fluid at a suction chamber pressure Ps can flow into and out of the interior space 4 by opening and closing of the capacity control valve 1.

To the second valve chamber 6, a second communication passage 8 is connected. The second communication passage 8 is configured to communicate with a discharge chamber of the variable capacity compressor such that a fluid at a discharge chamber pressure Pd can flow into the second valve chamber 6 by opening and closing of the capacity control valve 1.

Further, in the first valve chamber 7, a first communication passage 10 is formed. The first communication passage 10 is communicated with a control chamber (crank chamber) of the variable capacity compressor, and allows the fluid at the discharge chamber pressure Pd flowed from the second valve chamber 6 by opening and closing of the capacity control valve 1 to flow out to the control chamber (crank chamber) of the variable capacity compressor.

In addition, the first communication passage 10, the second communication passage 8, and the third communication passage 9 penetrate through a peripheral surface of the valve main body 2 respectively, for example, at two equal intervals to six equal intervals. Further, an outer peripheral surface of the valve main body 2 is formed as four stepped surfaces, and on the outer peripheral surface, mounting grooves for O-rings are provided at three positions apart from each other in the axial direction. Then, to the respective mounting grooves, an O ring 46 to seal between the valve main body 2 and a mounting hole (not shown) of a casing to which the valve main body 2 is fitted is mounted, and each of the first communication passage 10, the second communication passage 8, and the third communication passage 9 is configured as an independent flow passage.

In the interior space 4, the pressure sensitive body 22 is arranged. In the pressure sensitive body 22, one end part of a metallic bellows 22A is sealingly coupled to a partition adjustment part 3. This bellows 22A is manufactured by phosphor bronze or the like, and is designed such that its spring constant is a predetermined value. An interior space of the pressure sensitive body 22 is a vacuum or air exists therein. Then, the suction chamber pressure Ps in the interior space 4 acts to an effective pressure receiving area of the bellows 22A of the pressure sensitive body 22, and actuates the pressure sensitive body 22 to be extended and contracted. On a free end part side moving so as to extend and contract in response to the suction pressure in the interior space 4, a free end part 22B having a communication part 22C communicating with the interior space 4 is arranged.

Then, the partition adjustment part 3 of the pressure sensitive body 22 is fitted and fixed so as to block the interior space 4 of the first valve main body 2A. In addition, if the partition adjustment part 3 is screwed, or fixed by a set screw (not shown), spring force of compression springs arranged in parallel within the bellows 22A or of the bellows 22A can be adjusted to be moved in the axial direction.

Next, the valve body 21 will be described. The valve body 21 is a hollow cylindrical member and has an intermediate communication passage 26 in the interior thereof, and the intermediate communication passage 26 consists of an open end part 26A communicating with the interior space 4 via the communication part 22C of the pressure sensitive body 22, a pipe line part 26B communicating with the open end part 26A and penetrating in the axial direction through the valve body 21, and a communication hole 26C for communicating the pipe line part 26B and the first valve chamber 7. Moreover, the valve body 21 has, in the exterior thereof, a valve body second end part 21A arranged in the interior space 4, a second valve part 21B formed to have a diameter smaller than that of the valve body second end part 21A successively to the valve body second end part 21A, a first valve part 21C formed to have a diameter larger than that of the second valve part 21B successively to the second valve part 21B, and a valve body first end part 21E which is formed to have a diameter smaller than that of the first valve part 21C successively to the first valve part 21C and through which the communication hole 26C penetrates in a radial direction. Further, at one end part of the first valve part 21C, that is, in a boundary portion between the valve body first end part 21E and the first valve part 21C, a first valve part surface 21C1 formed in the radial direction almost perpendicular to a central axis of the valve body 21 is arranged, and at the other end part of the first valve part 21C, that is, in a boundary portion between the first valve part 21C and the second valve part 21B, a second valve part surface 21B1 formed in the radial direction almost perpendicular to the central axis of the valve body 21 is arranged.

The first valve part 21C is arranged in the first valve chamber 7, and the first valve part surface 21C1 opens and closes the intermediate communication passage 26 by being engaged with and disengaged from a first valve seat surface 31A formed on a lower end surface of a stator core 31 of the solenoid section 30. Then, when the first valve part 21C is opened, the control chamber is communicated with the suction chamber via the first communication passage 10, the first valve chamber 7, the intermediate communication passage 26, the interior space 4, and the third communication passage 9, and a fluid at a control chamber pressure Pc can flow into the suction chamber from the control chamber.

Hereinafter, a flow passage leading to the interior space 4 communicating with the suction chamber via the first valve part 21C and the intermediate communication passage 26 from the first valve chamber 7 communicating with the control chamber will be denoted as a Pc-Ps flow passage.

The second valve part 21B is arranged in the second valve chamber 6, and the second valve part surface 21B1 opens and closes the valve hole 5 for communicating the first valve chamber 7 and the second valve chamber by being engaged with and disengaged from a second valve seat surface 6A. When the second valve part 21B is opened, the discharge chamber is communicated with the control chamber via the second valve chamber 6, the valve hole 5, the first valve chamber 7, and the first communication passage 10 from the second communication passage 8, and the fluid at the discharge chamber pressure Pd can flow into the control chamber from the discharge chamber. Hereinafter, a flow passage leading to the first valve chamber 7 communicating with the control chamber via the valve hole 5 and the second valve part 21B from the second valve chamber 6 communicating with the discharge chamber will be denoted as a Pd-Pc flow passage.

The valve body second end part 21A is arranged in the interior space 4, and the valve body second end part 21A abuts on the free end part 22B of the pressure sensitive body 22, and moves the valve body 21 in the axial direction within the through hole of the first valve main body 2A in association with extension and contraction of the pressure sensitive body 22. Moreover, in a state that the valve body second end part 21A abuts on the free end part 22B of the pressure sensitive body 22, the interior space 4 is constantly communicated with the open end part 26A, the pipe line part 26B, and the communication hole 26C of the intermediate communication passage 26 via the communication part 22C. In addition, the communication part 22C has an opening area larger than those of the open end part 26A, the pipe line part 26B, and the communication hole 26C.

Next, the solenoid section 30 will be described. The solenoid section 30 is constituted by a solenoid rod 25, a plunger case 34, an electromagnetic coil 35, the stator core 31, a plunger 32, and a spring means 28 which are contained in a solenoid case 33. Between the valve body 21 and the plunger 32, the stator core 31 fixed to the second valve main body 2B is provided, and the solenoid rod 25 is movably fitted in a through hole 31D of the stator core 31, and couples the valve body 21 and the plunger 32. In addition, a coupling part 25A provided at a lower end part of the solenoid rod 25 is fitted to a fitting part 21D of the valve body first end part 21E, and the other end part thereof on the opposite side is fitted and coupled to a fitting hole 32A of the plunger 32.

The plunger case 34 is a bottomed hollow cylindrical member whose one end is opened. The plunger case 34 is fitted to an inner diameter part of the electromagnetic coil 35, and the open end part side of the plunger case 34 is sealingly fitted and fixed to a fitting hole of the second valve main body 2B, and the bottomed part side thereof is fixed to a fitting hole of an end part of the solenoid case 33. Thereby, the electromagnetic coil 35 is sealed by the plunger case 34, the second valve main body 2B, and the solenoid case 33, and does not contact the refrigerant, and therefore it is possible to prevent reduction in insulation resistance.

In the inner diameter part on the open end part side of the plunger case 34, the stator core 31 is fitted, and in the inner diameter part on the bottomed part side of the plunger case 34, the plunger 32 is axially movably fitted. On the plunger 32 side of the stator core 31, a spring seat chamber 31C is formed. In the spring seat chamber 31C, the spring means 28 for biasing the plunger 32 so as to be separated from the stator core 31 is arranged. That is, the spring means 28 biases the first valve part 21C so as to be in a closed state from an opened state, and biases the second valve part 21B so as to be in an opened state from a closed state. Moreover, between the first valve seat surface 31A and the through hole 31D of the stator core 31, a communication space 27 is formed. In the communication space 27, the communication hole 26C communicating with the pipe line part 26B of the valve body 21 is arranged.

Separation and contact of an adsorption surface 31B of the stator core 31 and a bonded surface 32B of the plunger 32 are performed by strength of a current flowing through the electromagnetic coil 35. That is, in a state that the electromagnetic coil 35 is not energized, a maximum air gap is formed between the adsorption surface 31B of the stator core 31 and the bonded surface 32B of the plunger 32 by repulsion of the spring means 28, and the first valve part 21C is closed and the second valve part 21B is opened. On the other hand, in an energized state, the bonded surface 32B of the plunger 32 is attracted by a magnetic attractive force to the adsorption surface 31B of the stator core 31, and the first valve part 21C is opened and at the same time the second valve part 21B is moved in a valve closing direction. The magnitude of the current supplied to the electromagnetic coil 35 is controlled by a control part (not shown) according to an opening and closing degree of each valve part of the valve body 21.

The operation of the capacity control valve 1 having the configuration described above will be described. Referring to FIG. 1 and FIG. 2, the operating state of the first valve part 21C will be described. It should be noted that, in FIG. 1 and FIG. 2(*a*), a thick curved line denotes the Pc-Ps flow passage.

The first valve part 21C interlocks with the second valve part 21B in the opposite direction to each other. That is, at the time of discharge of the liquid refrigerant in FIG. 2(*a*), the second valve part surface 21B1 is engaged with the second valve seat surface 6A and the second valve part 21B is in a fully closed state, and on the other hand, the first valve part surface 21C1 is separated from the first valve seat surface 31A of the stator core 31 of the solenoid section 30 and the first valve part 21C is in a fully opened state. In a control area in FIG. 2(*b*), the second valve part surface 21B1 of the second valve part 21B is disengaged from the second valve seat surface 6A, and at the same time, the first valve part 21C is changed from the fully opened state to a narrowed state. At the time of OFF in FIG. 2(*c*), the second valve part 21B is in a fully opened state, and the first valve part surface 21C1 is engaged with the first valve seat surface 31A and is in a fully closed state. Hereinafter, the states of FIGS. 2(*a*), 2(*b*) and 2(*c*) will be described in detail.

In FIG. 2(*a*), since the first valve part 21C is in a fully opened state, an axial gap part formed between the first valve part surface 21C1 and the first valve seat surface 31A becomes a maximum axial gap part ΔLmax, and an opening area S1 of the first valve part 21C becomes a maximum S1max at the time of discharge of the liquid refrigerant. Moreover, the maximum opening area S1max of the first valve part 21C for controlling the intermediate communication passage 26 to be opened and closed is set smaller than an opening part area Sa of the open end part 26A, the pipe line part 26B, and the communication hole 26C of the intermediate communication passage 26, and therefore the opening area of the first valve part 21C is minimum in the Pc-Ps flow passage, and the first valve part 21C serves as a bottleneck of the Pc-Ps flow passage. Therefore, the amount of the refrigerant flowing into the interior space 4 through the Pc-Ps flow passage from the first valve chamber 7 is determined according to the size of the opening area of the first valve part 21C serving as the bottleneck, and even if the opening area of the open end part 26A, the pipe line part 26B, and the communication hole 26C of the intermediate communication passage 26 is increased, the amount of the refrigerant flowing through the Pc-Ps flow passage is nearly unchanged.

However, if the maximum opening area S1max of the first valve part 21C serving as the bottleneck of the Pc-Ps flow passage is too reduced, there is a fear that a discharge function of the liquid refrigerant is inhibited. Accordingly, a minimum value of the maximum opening area S1max of the first valve part 21C needs to be defined. That is, the maximum opening area S1max of the first valve part 21C between the first valve part surface 21C1 and the first valve seat surface 31A is set so as to exceed the amount of a blow-by gas leaking out of the gap between a piston and a cylinder of the variable capacity compressor to the control chamber (crank chamber). Thereby, at the time of discharge of the liquid refrigerant of the variable capacity compressor when a discharge pressure is highest (at the time of full capacity operation), even if the leak amount of the blow-by gas is increased by factors such as relative wear between the piston and a slide part, the maximum opening area S1max of the first valve part 21C is secured, and the liquid refrigerant can be efficiently discharged to the suction chamber from the control chamber (crank chamber).

Next, when discharge of the liquid refrigerant using the Pc-Ps flow passage is finished, the solenoid section 30 is controlled, thereby the control area for controlling the pressure of the control chamber using the Pd-Pc-flow passage is started. In the control area shown in FIG. 2(b), the second valve part surface 21B1 of the second valve part 21B is disengaged from the second valve seat surface 6A and communication of the Pd-Pc flow passage is started, and at the same time, the first valve part 21C interlocking with the second valve part 21B in the opposite direction is changed from the fully opened state to a narrowed state and the Pc-Ps flow passage is narrowed. Therefore, since an opening degree of the first valve part 21C serving as the bottleneck of the Pc-Ps flow passage is narrowed, the refrigerant flowing out of the first valve chamber 7 to the interior space 4 is decreased, and the second valve part of the Pd-Pc flow passage is opened and the amount of the refrigerant flowing into the first valve chamber 7 communicating with the control chamber from the second valve chamber 6 is increased, thereby the pressure of the control chamber can be rapidly controlled.

Further, when the solenoid section 30 is OFF as shown in FIG. 2(c), the valve body 21 is moved by a biasing force of the spring means 28, the second valve part 21B is in a fully opened state and the Pd-Pc flow passage is fully opened, and the first valve part surface 21C1 of the first valve part 21C is engaged with the first valve seat surface 31A and is in a fully closed state and the Pc-Ps flow passage is blocked.

Next, the relationships of the opening area of the first valve part, the opening area of the Pd-Pc flow passage, and the opening part area of the intermediate passage with respect to the stroke of the valve body 21 will be described in FIG. 3. The horizontal axis in FIG. 3 shows the stroke of the valve body 21, and the valve body 21 is moved in a range of a maximum stroke width ΔLmax=Le−Ls. The vertical axis shows the opening part area, and the opening part area Sa of the intermediate passage shown by a two-dot chain line in FIG. 3 shows a minimum area among the open end part 26A, the pipe line part 26B, and the communication hole 26C of the intermediate communication passage 26 and it is constant. An opening area S3 of the Pd-Pc flow passage shown by a solid line in FIG. 3 shows the opening area S3 of the second valve part 21B, and it is zero at the time of discharge of the liquid refrigerant, is gradually increased according to the stroke of the valve body 21, and is maximum when the solenoid is OFF. The opening area S1 of the first valve part shown by a dotted line in FIG. 3 is the maximum opening area S1max at the time of discharge of the liquid refrigerant, it is gradually decreased according to the stroke of the valve body 21, and it becomes zero when the solenoid is OFF.

As to the stroke Ls (at the time of discharge of the liquid refrigerant) of the valve body 21 in FIG. 3, the second valve part 21B is fully closed, that is, the opening area of the Pd-Pc flow passage is zero, and the first valve part 21C has the maximum opening area S1max and the opening part area Sa of the intermediate communication passage. Accordingly, the amount of the refrigerant flowing into the control chamber from the discharge chamber becomes zero by blocking the Pd-Pc flow passage, and the first valve part 21C for controlling the Pc-Ps flow passage to be opened and closed has the maximum opening area S1max and the resistance to the suction chamber from the control chamber becomes minimum, thereby the refrigerant can be discharged to the suction chamber from the control chamber in a short time.

Next, when changed to the stroke Ls<L<Lm, that is, the control area of the valve body 21 in FIG. 3, the second valve part 21B is disengaged from the second valve seat surface 6A and at the same time the first valve part 21C is narrowed, the opening area S1 of the first valve part 21C is decreased in proportion to the stroke as shown by the dotted line in FIG. 3, and the opening area S3 of the second valve part 21B is increased in proportion to the stroke as shown by the solid line. As a result, in the control area (Ls<L<Lm), the amount of the refrigerant at the control pressure flowing out of the first valve chamber 7 communicating with the control chamber to the interior space 4 communicating with the suction chamber is decreased because the resistance of Pc-Ps flow passage is increased according to the stroke L of the valve body 21, and the amount of the refrigerant at the discharge pressure flowing into the first valve chamber 7 communicating with the control chamber from the second valve chamber 6 communicating with the discharge chamber is increased because the resistance of the Pd-Pc flow passage is decreased according to the stroke L of the valve body 21, thereby the pressure of the control chamber can be rapidly controlled.

The capacity control valve according to the first embodiment of the present invention described above exhibits the following excellent effects.

At the time of discharge operation of the liquid refrigerant of the variable capacity compressor, the inflow of the refrigerant to the control chamber from the discharge chamber is blocked by blocking the Pd-Pc flow passage, and the opening area of the first valve part 21C for opening and closing the Pc-Ps flow passage is set to the maximum opening area S1max, thereby the amount of the refrigerant flowing to the suction chamber through the Pc-Ps flow passage from the control chamber can be maximized, and therefore the liquid refrigerant accumulated in the control chamber is discharged in a short time, and the start-up time of the variable capacity compressor can be shortened.

When discharge of the liquid refrigerant of the variable capacity compressor is finished, the second valve part 21B of the valve body 21 is disengaged from the second valve seat surface 6A and the opening degree is increased according to the stroke L of the valve body 21, and at the same time the first valve part 21C serving as the bottleneck of the Pc-Ps flow passage is narrowed according to the stroke L of the valve body 21. Thereby, the amount of the refrigerant at the control pressure flowing out of the control chamber to the suction chamber is decreased because the resistance of Pc-Ps flow passage is increased according to the stroke L of the valve body 21, and the amount of the refrigerant at the discharge pressure flowing into the control chamber from the discharge chamber is increased because the resistance of the Pd-Pc flow passage is decreased according to the stroke L of the valve body 21, thereby the pressure of the control chamber can be rapidly controlled.

Second Embodiment

Figure 4:
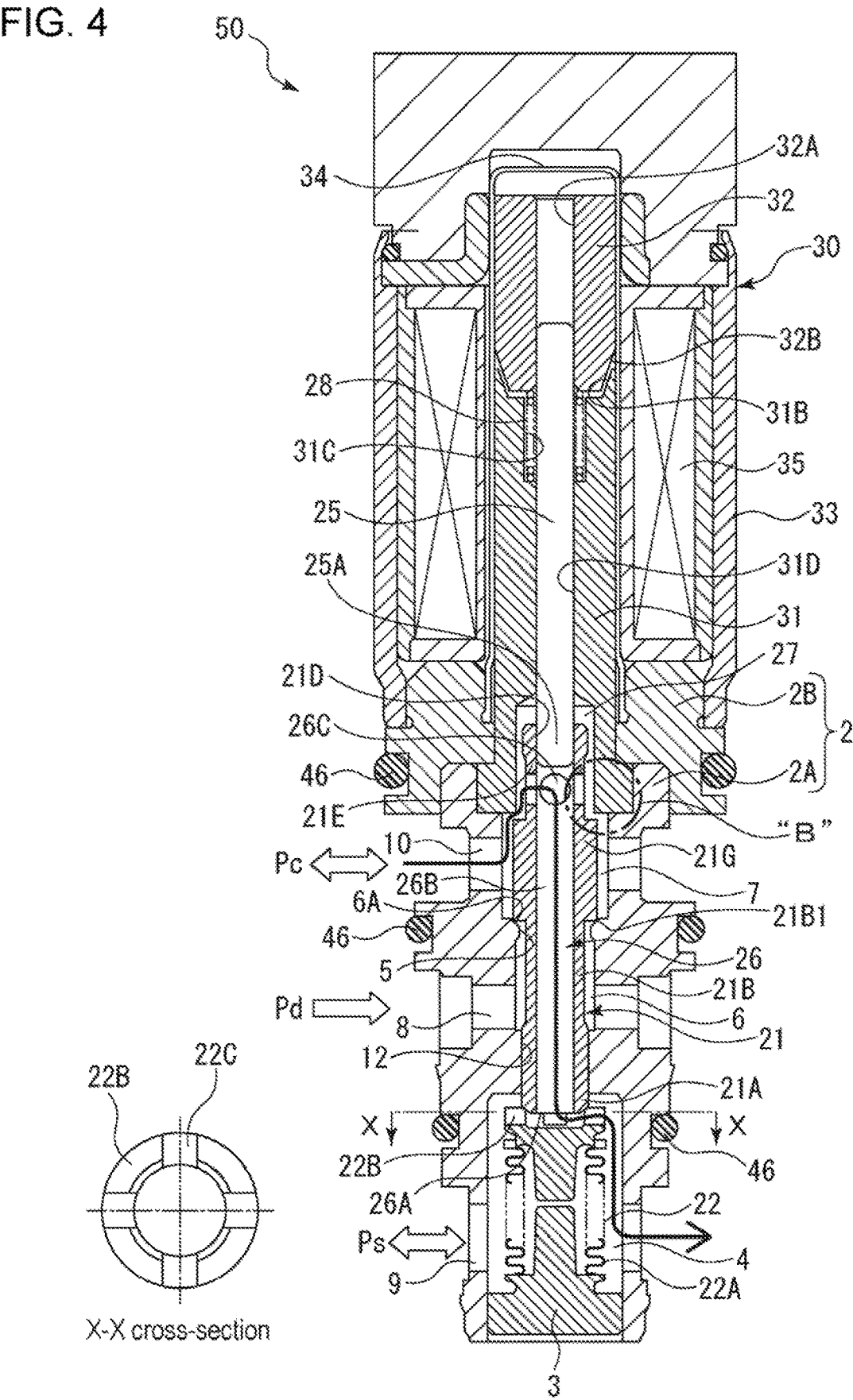
FIG. 4 is a front cross-sectional view showing a capacity control valve according to a second embodiment of the present invention.
Figure 5:
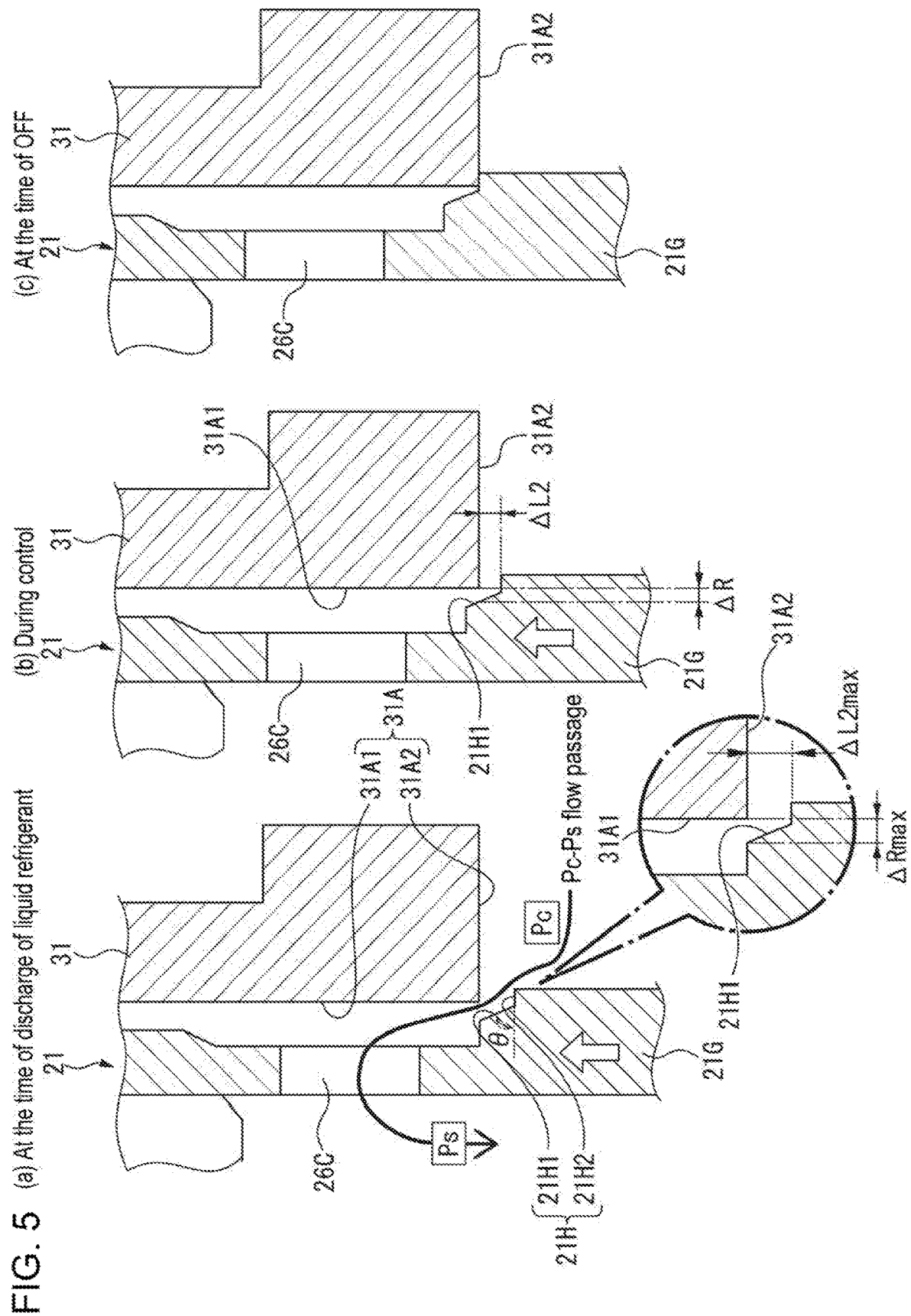
FIG. 5 is an enlarged view of a portion B in FIG. 4, and shows an opening state of the first valve part in each state.
Figure 6:
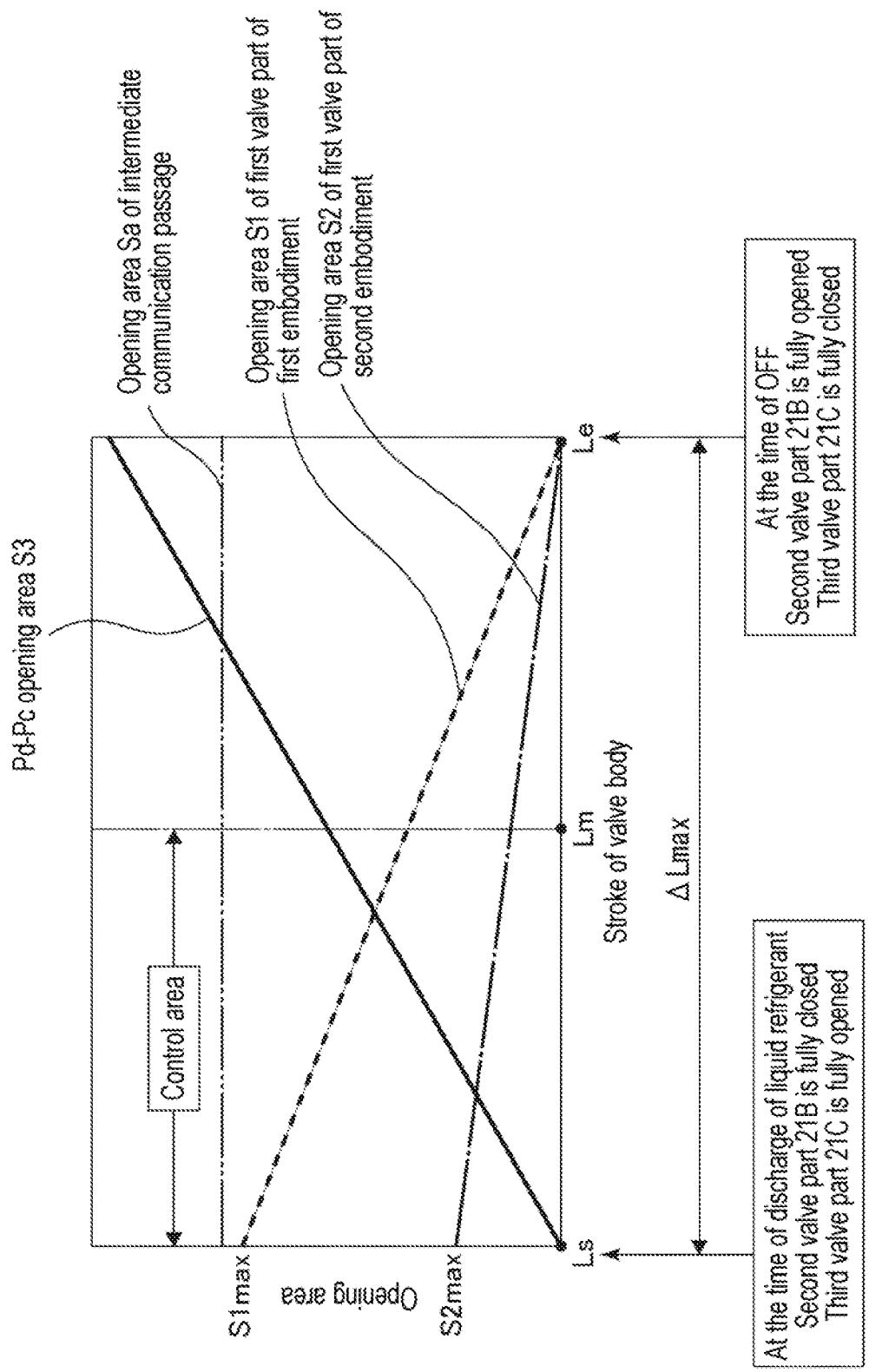
FIG. 6 is an explanatory diagram for explaining relationships between the opening areas of the Pc-Ps flow passage and the Pd-Pc flow passage and the stroke of the valve body of the capacity control valves according to the first embodiment and the second embodiment.
Figure 7:
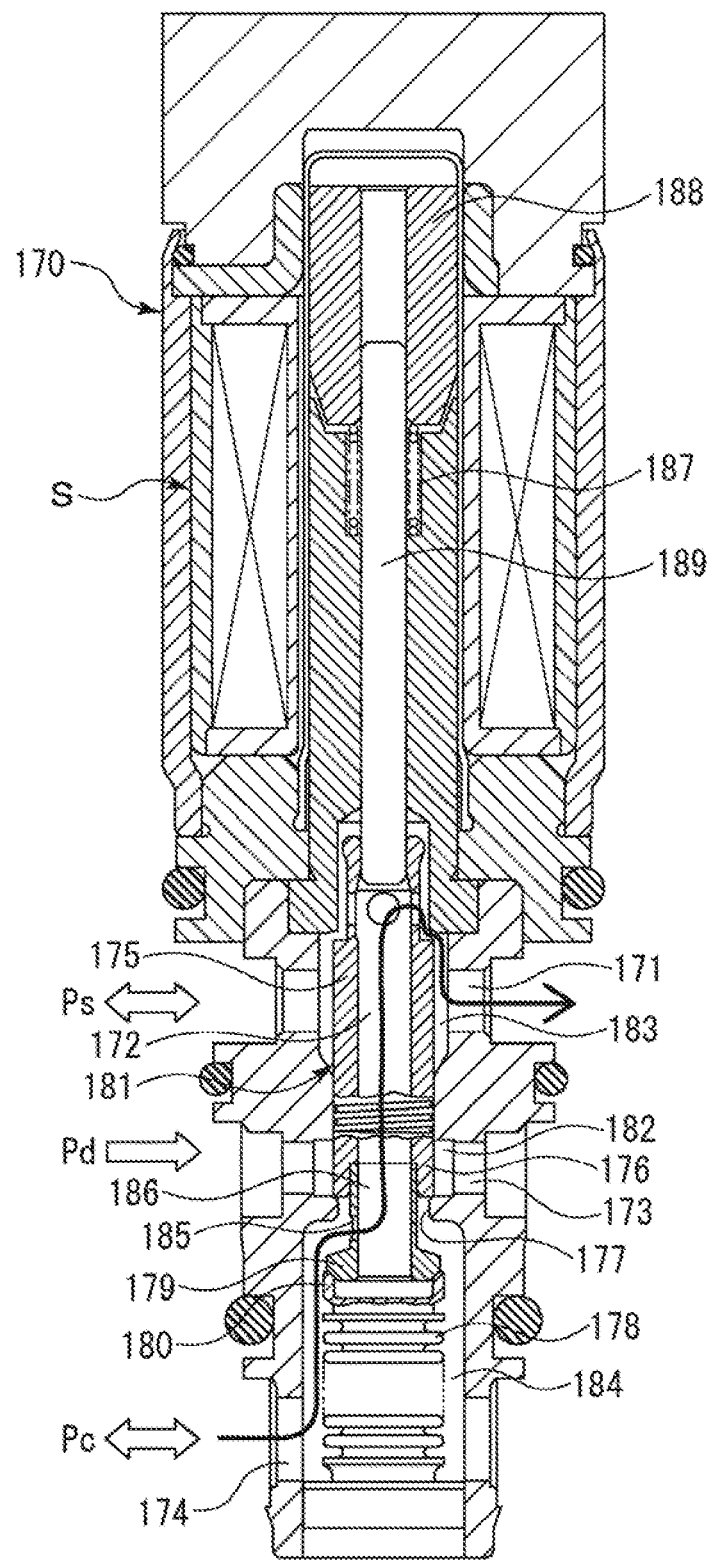
FIG. 7 is a front cross-sectional view showing a capacity control valve of a conventional art.
Figure 8:
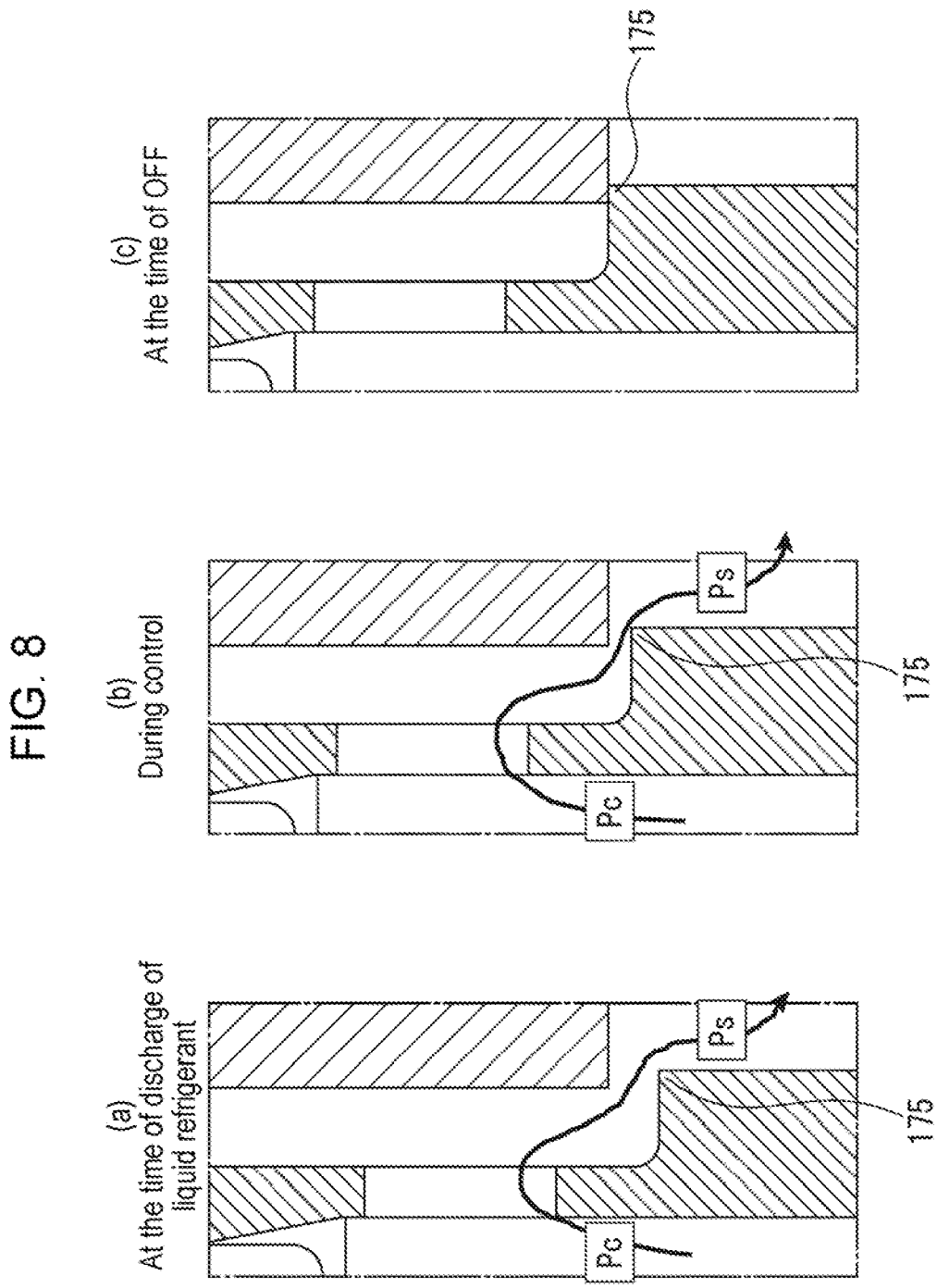
FIG. 8 is a diagram showing an opening state of a first valve part of the capacity control valve according to the conventional art.

Referring to FIG. 4 to FIG. 6, a capacity control valve according to a second embodiment of the present invention will be described. A capacity control valve 50 according to the second embodiment is mainly different from the first embodiment in that a first valve part surface 21H formed in a boundary portion between the valve body first end part 21E and a first valve part 21G of the valve body 21 is formed by a tapered surface, but the other basic configuration is the same as that in the first embodiment, so the same members are denoted by the same numerals and symbols, and redundant descriptions will be omitted.

FIG. 4 is a front cross-sectional view showing the capacity control valve according to the second embodiment of the present invention. FIG. 5 is an enlarged view of a portion B in FIG. 4 and shows the operating state of the valve body 21.

The valve body 21 is a hollow cylindrical member and has the intermediate communication passage 26 in the interior thereof, and moreover, the valve body 21 has, in the exterior thereof, the valve body second end part 21A arranged in the interior space 4, the second valve part 21B formed to have a diameter smaller than that of the valve body second end part 21A successively to the valve body second end part 21A, the first valve part 21G formed to have a diameter larger than that of the second valve part 21B successively to the second valve part 21B, and the valve body first end part 21E which is formed to have a diameter smaller than that of the first valve part 21G successively to the first valve part 21G and in which the communication hole 26C communicating with the intermediate communication passage 26 is arranged. Further, at one end part of the first valve part 21G, that is, in a boundary portion between the valve body first end part 21E and the first valve part 21G, the first valve part surface 21H is arranged, and at the other end part of the first valve part 21G, that is, in a boundary portion between the first valve part 21G and the second valve part 21B, the second valve part surface 21B1 is arranged. Moreover, the first valve part surface 21H consists of an end surface 21H2 opposed to the first valve seat surface 31A and formed in the radial direction, and a tapered surface 21H1 whose diameter is gradually decreased toward the axial direction from an inner diameter part of the end surface 21H2.

The first valve seat surface 31A formed on a lower end surface of the stator core 31 of the solenoid section 30 consists of an inner wall part 31A1 and an end surface 31A2. Then, a size ΔL of an axial gap part formed between the end surface 21H2 of the first valve part surface 21H and the end surface 31A2 of the first valve seat surface 31A is changed according to the stroke of the valve body 21, and the end surface 21H2 of the first valve part surface 21H and the end surface 31A2 of the first valve seat surface 31A are engaged and disengaged to open and close the Pc-Ps flow passage. Moreover, the size of a radial gap part ΔR formed between the tapered surface 21H1 and the first valve seat surface 31A is also changed according to the stroke of the valve body.

Next, the operation of the valve body 21 will be described based on FIG. 5. In FIG. 5(a), the radial gap part ΔR formed between the tapered surface 21H1 of the first valve part surface 21H and the inner wall part 31A1 of the first valve seat surface 31A is the narrowest, and at the time of discharge of the liquid refrigerant, the radial gap part becomes a maximum radial gap part ΔRmax, and the opening area becomes a maximum opening area S2max. Moreover, the maximum opening area S2max is set smaller than the opening parts of the open end part 26A, the pipe line part 26B, and the communication hole 26C. Accordingly, the resistance of the first valve part 21G is largest in the Pc-Ps flow passage, and the first valve part 21G serves as a bottleneck. Therefore, since the amount of the refrigerant flowing into the interior space 4 from the first valve chamber 7 is determined according to the size of the radial gap part ΔR of the first valve part 21G serving as the bottleneck, even if the opening area of the open end part 26A, the pipe line part 26B, and the communication hole 26C of the intermediate communication passage 26 is increased, the amount of the refrigerant flowing through the Pc-Ps flow passage is nearly unchanged.

Moreover, the maximum opening area S2max of the first valve part 21G as with the first embodiment is set so as to exceed the amount of a blow-by gas leaking out of the gap between the piston and the cylinder to the control chamber (crank chamber) in consideration of factors such as relative wear between the piston and the slide part.

The axial gap between the end surface 21H2 of the first valve part surface 21H and the end surface 31A2 of the first valve seat surface 31A becomes a stroke width ΔL2 of the valve body 21. The maximum opening area S2max of the first valve part 21G of the second embodiment is smaller than the maximum opening area S1max of the first valve part 21C of the first embodiment, but the stroke width ΔL2 of the second embodiment has almost same size as a stroke width ΔL1 of the first embodiment.

In a case of the first embodiment shown in FIG. 2, since the opening area of the first valve part 21C is formed by the axial gap part formed between the first valve part surface 21C1 and the first valve seat surface 31A, the maximum opening area S1max is determined according to the stroke width ΔL1. That is, in a case where the maximum opening area S1max is reduced in the first embodiment, the stroke width ΔL1 of the valve body 21 needs to be reduced, and if the maximum opening area S1max is small, there is a fear that the stroke width ΔL1 of the valve body 21 is too reduced and controllability of the capacity control valve is deteriorated.

In contrast, in a case of the second embodiment shown in FIG. 5, the opening part of the first valve part 21G in the control area is formed by the axial gap part ΔR formed between the tapered surface 21H1 of the first valve part surface 21H and the inner wall part 31A1 of the first valve seat surface 31A. Accordingly, in a case where the maximum opening area S2max is reduced in the second embodiment, an angle θ of the tapered surface 21H1 of the first valve part surface 21H may be adjusted, and the stroke width ΔL2 of the valve body 21 does not always have to be adjusted. Therefore, even if the maximum opening area S2max of the first valve part 21G is reduced, the stroke width ΔL2 of the valve body 21 does not need to be reduced, and therefore controllability of the capacity control valve is not affected.

In the control area shown in FIG. 5(b), the second valve part surface 21B1 of the second valve part 21B is disengaged from the second valve seat surface 6A and communication of the Pd-Pc flow passage is started, and at the same time, the first valve part 21G is changed from the fully opened state to the narrowed state and the Pc-Ps flow passage is narrowed. At this time, since the second valve part 21B is opened and at the same time the first valve part 21G serving as the bottleneck of the Pc-Ps flow passage is narrowed according to the stroke of the valve body 21, the refrigerant flowing out of the control chamber through the Pc-Ps flow passage to the suction chamber is decreased, and the refrigerant flowing into the control chamber via the Pd-Pc flow passage from the discharge chamber is increased, and therefore the pressure of the control chamber can be rapidly controlled.

Further, when the solenoid section 30 is OFF as shown in FIG. 5(c), the valve body 21 is moved by a biasing force of the spring means 28, the second valve part 21B is in a fully opened state and the Pd-Pc flow passage is fully opened, and the end surface 21H2 of the first valve part surface 21H of the first valve part 21G is engaged with the end surface 31A2 of the first valve seat surface 31A and is in a fully closed state and the Pc-Ps flow passage is blocked. In addition, in a state that the Pc-Ps flow passage is blocked, the tapered surface 21H1 of the first valve part surface 21H has an air gap with the first valve seat surface 31A and does not contact it.

Next, the relationships of the opening area of the first valve part, the opening area of the Pd-Pc flow passage, and the opening area of the intermediate communication passage 26 with respect to the strokes of the valve body 21 of the first embodiment and the second embodiment will be described in FIG. 6. The change in the opening area S1 of the first valve part with respect to the stroke of the valve body 21 in the first embodiment is shown by a dotted line. Moreover, the change in the opening area S2 of the first valve part with respect to the stroke of the valve body 21 in the second embodiment is shown by a chain line. The opening part area Sa of the intermediate communication passage 26 is constant with respect to the stroke of the valve body 21 and is shown by a two-dot chain line. Further, the change in the opening area S3 of the Pd-Pc flow passage with respect to the stroke of the valve body 21 is shown by a solid line. In addition, the opening area of the second valve part whose opening area is minimum in the Pd-Pc flow passage is shown.

As shown in FIG. 6, the opening area S1 of the first valve part of the first embodiment and the opening area S2 of the first valve part of the Pc-Ps flow passage of the second embodiment become the maximum opening area S1max, S2max respectively in the stroke Ls, and S1max is larger than S2max. On the other hand, a stroke width ΔL1max (see FIG. 2) of the valve body in the first embodiment and a stroke width ΔL2max (FIG. 5) of the valve body in the second embodiment are set to be about the same. Therefore, as to a change rate in the opening part area of the Pc-Ps flow passage with respect to the stroke of the valve body 21, that is, a slope of the change in the opening part area of the Pc-Ps flow passage with respect to the stroke, the second embodiment is smaller than the first embodiment. That is, the maximum radial gap part ΔRmax is adjusted by the angle θ of the tapered surface 21H1 of the first valve part surface 21H, and thereby the slope of the change in the opening part area of the Pc-Ps flow passage with respect to the stroke of the valve body 21 can be adjusted, and therefore the maximum opening area S2max can be reduced without reducing the stroke width ΔL=Le−Ls of the valve body 21. Thereby, the stroke width ΔL of the valve body 21 can be secured even if the maximum opening area S2max is reduced, and therefore it is possible to prevent deterioration in controllability of the capacity control valve.

The capacity control valve according to the second embodiment of the present invention exhibits the following excellent effects in addition to the effects of the first embodiment.

Although the maximum opening area S2max of the first valve part 21G needs to be set smaller than the opening parts of the open end part 26A, the pipe line part 26B, and the communication hole 26C of the intermediate communication passage 26, in a case of the structure in which the maximum opening area S2max depends on the stroke width ΔL of the valve body 21 as with the first embodiment, the stroke width ΔL is too reduced when the maximum opening area S2max of the first valve part 21G is reduced, and there is a fear that controllability is deteriorated. In the capacity control valve 50 of the second embodiment, by adjusting the angle θ of the tapered surface 21H1 of the first valve part surface 21H, the maximum opening area S2max can be reduced without reducing the stroke width ΔL=Le−Ls of the valve body 21. Accordingly, the stroke width ΔL of the valve body 21 can be secured even if the maximum opening area S2max is reduced, and therefore it is possible to prevent deterioration in controllability of the capacity control valve.

REFERENCE SIGNS LIST 1, 50 Capacity control valve
2 Valve main body
3 Partition adjustment part
4 Interior space (Control chamber)
5 Valve hole
7 6 Second valve chamber
7 First valve chamber
8 Second communication passage
9 Third communication passage
10 First communication passage
21 Valve body
21A Valve body second end part (abutment part)
21B Second valve part
21B1 Second valve part surface
21C First valve part
21C1 First valve part surface
21G First valve part
21H First valve part surface
22 Pressure-sensitive body
22A Bellows
22B Free end part
26 Intermediate communication passage
28 Spring means
30 Solenoid section
31 Stator core
31A First valve seat surface
32 Plunger
33 Solenoid case
34 Plunger case
35 Electromagnetic coil
Pd Discharge chamber pressure
Ps Suction chamber pressure
Pc Control chamber pressure
S1 Opening area of intermediate communication passage (First embodiment)
S2 Opening area of intermediate communication passage (Second embodiment)

The invention claimed is:

1. A capacity control valve for controlling a flow rate or pressure in a control chamber according to a valve opening degree of a valve section, said capacity control valve comprising:
    a valve main body having a first valve chamber communicating with a first communication passage through which a fluid at control pressure passes and having a first valve seat surface and a second valve seat surface, a second valve chamber having a valve hole communicating with the first valve chamber and communicating with a second communication passage through which a fluid at discharge pressure passes, and an interior space communicating with a third communication passage through which a fluid at suction pressure passes;
    a pressure sensitive body arranged in the interior space and having a communication part communicating with the interior space on a free end part side of a free end part moving so as to extend and contract in response to the suction pressure;
    a valve body including at least an intermediate communication passage for communicating the first valve chamber and the interior space, a second valve part for opening and closing the valve hole for communicating the first valve chamber and the second valve chamber by separating from and contacting with the second valve seat surface, a first valve part for opening and closing the intermediate communication passage by separating from and contacting with the first valve seat surface in conjunction with the second valve part in the opposite direction thereto, and an abutment part abutting the free end part of the pressure sensitive body; and
    a solenoid section attached to the valve main body and actuating the first valve part and the second valve part of the valve body so as to open the first valve seat surface and close the second valve seat surface, and wherein:
    an opening area of the first valve part is smaller than that of the intermediate communication passage.

2. The capacity control valve according to claim 1, wherein the first valve part has a first valve part surface opposed to the first valve seat surface, and an axial gap whose size is changed according to a stroke of the valve body is included between the first valve part surface and the first valve seat surface.

3. The capacity control valve according to claim 1, wherein the first valve part has a first part surface opposed to the first valve seat surface in a radial direction and a tapered surface whose diameter is reduced toward an axial direction from an inner diameter part of the first valve part surface, and an axial gap whose size is changed according to a stroke of the valve body is included between the first valve part surface and the first valve seat surface and a radial gap whose size is changed according to the stroke of the valve body is included between the tapered surface and the first valve seat surface.

4. The capacity control valve according to claim 1, wherein the opening area of the first valve part when the second valve part is closed, is set to discharge any blow-by gas accumulated in the capacity control valve during operation.

5. The capacity control valve according to claim 4, wherein the first valve part has a first valve part surface opposed to the first valve seat surface, and an axial gap whose size is changed according to a stroke of the valve body is included between the first valve part surface and the first valve seat surface.

6. The capacity control valve according to claim 4, wherein the first valve part has a first valve part surface opposed to the first valve seat surface in a radial direction and a tapered surface whose diameter is reduced toward an axial direction from an inner diameter part of the first valve part surface, and an axial gap whose size is changed according to a stroke of the valve body is included between the first valve part surface and the first valve seat surface and a radial gap whose size is changed according to the stroke of the valve body is included between the tapered surface and the first valve seat surface.

7. The capacity control valve according to claim 1, wherein the second valve part is disengaged from the second valve seat surface, and at the same time, resistance of a flow passage leading to the interior space from the first valve chamber is increased according to a stroke of the valve body, and resistance of a flow passage leading to the first valve chamber from the second valve chamber is decreased according to the stroke of the valve body.

8. The capacity control valve according to claim 7, wherein the first valve part has a first valve part surface opposed to the first valve seat surface, and an axial gap whose size is changed according to the stroke of the valve body is included between the first valve part surface and the first valve seat surface.

9. The capacity control valve according to claim 7, wherein the first valve part has a first valve part surface opposed to the first valve seat surface in a radial direction and a tapered surface whose diameter is reduced toward an axial direction from an inner diameter part of the first valve part surface, and an axial gap whose size is changed according to the stroke of the valve body is included between the first valve part surface and the first valve seat surface and a radial gap whose size is changed according to the stroke of the valve body is included between the tapered surface and the first valve seat surface.

10. The capacity control valve according to claim 7, wherein the opening area of the first valve part when the second valve part is closed, is set to discharge any blow-by gas accumulated in the capacity control valve during operation.

11. The capacity control valve according to claim 10, wherein the first valve part has a first valve part surface opposed to the first valve seat surface, and an axial gap whose size is changed according to the stroke of the valve body is included between the first valve part surface and the first valve seat surface.

12. The capacity control valve according to claim 10, wherein the first valve part has a first valve part surface opposed to the first valve seat surface in a radial direction and a tapered surface whose diameter is reduced toward an axial direction from an inner diameter part of the first valve part surface, and an axial gap whose size is changed according to the stroke of the valve body is included between the first valve part surface and the first valve seat surface and a radial gap whose size is changed according to the stroke of the valve body is included between the tapered surface and the first valve seat surface.

* * * * *